Aug. 12, 1924.

J. B. GIACHETTO ET AL 1,505,018

HEADLIGHT CONTROL

Filed Sept. 7, 1923

John B. Giachetto
Benjamin Tex
INVENTOR

BY Victor J. Evans
ATTORNEY

WITNESS:

Patented Aug. 12, 1924.

1,505,018

UNITED STATES PATENT OFFICE.

JOHN B. GIACHETTO AND BENJAMIN TEX, OF KINCAID, ILLINOIS.

HEADLIGHT CONTROL.

Application filed September 7, 1923. Serial No. 661,454.

*To all whom it may concern:*

Be it known that we, JOHN B. GIACHETTO and BENJAMIN TEX, citizens of the United States, residing at Kincaid, in the county of Christian and State of Illinois, have invented new and useful Improvements in Headlight Controls, of which the following is a specification.

The object of this invention is the provision of means operable from the steering post of an automobile for operating the switch which controls the headlights, so that the operator can conveniently move the switch to "off", "dim" or "bright" positions without necessitating the usual bending of his body and liability of loss of control of the steering wheel.

A further object is the provision of means for this purpose which may be readily attached to the steering post column of an automobile and likewise readily attached to the switch handle and which is characteristic of simplicity in construction, cheapness in manufacture and reliability in opration.

To the attainment of the foregoing and other objects which will present themselves as the nature of the invention is better understood, reference is to be had to the drawing which accompanies and which forms part of this application.

In the drawing:—

Figure 1:
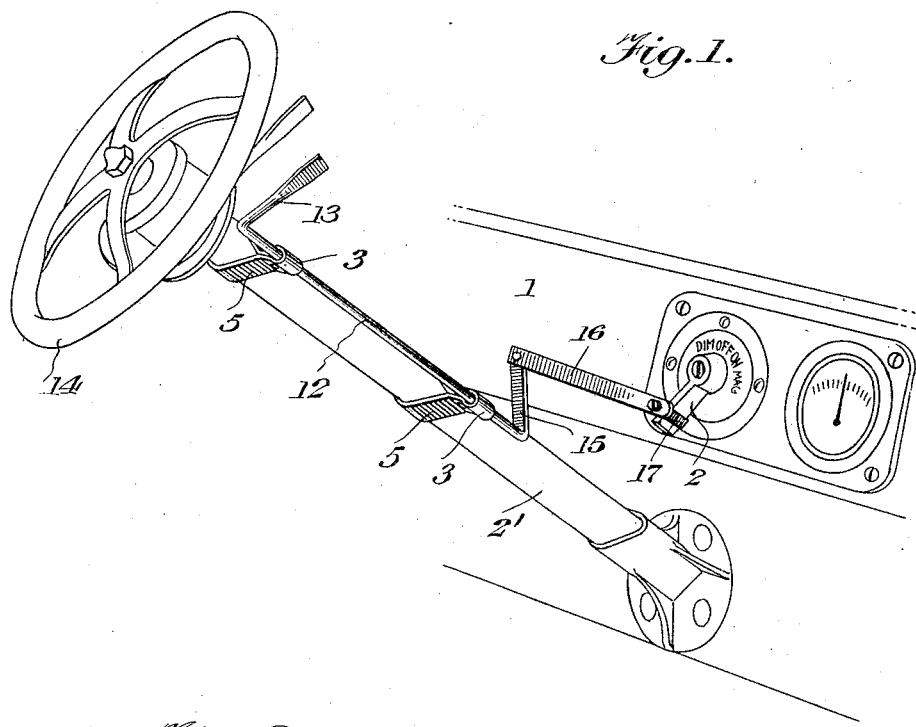
Figure 1 is a fragmentary perspective view of a sufficient portion of an automobile to illustrate the application of the improvement thereon.
Figure 2:
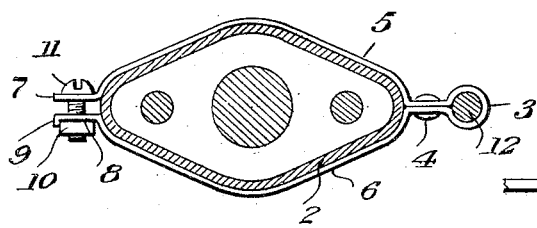
Figure 2 is a transverse sectional view through the steering post column in a line with one of the supporting clamps for the shaft of the improvement.
Figure 3:
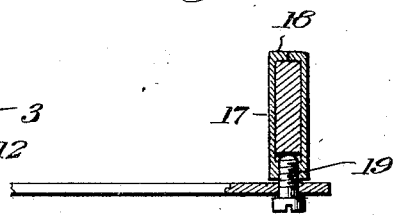
Figure 3 is a fragmentary sectional view, upon an enlarged scale to illustrate the manner in which the link is pivotally and adjustably secured to the switch handle.

Referring now to the drawing in detail, the numeral 1 designates the instrument board of an automobile upon which is mounted a switch 2 for the purpose of controlling the headlights, that is, for cutting them off or making them bright or dim, as desired.

The steering post column of the machine is indicated by the numeral 2', and has arranged therearound at spaced intervals a pair of clamps. Each of the clamps is constructed of a metal strap centrally bent upon itself to provide an eye 3 and extended in lapping relation from the said eye, the lapping portions being riveted, as at 4. The metal strap has its extensions or arms 5 and 6 disposed around the steering post column 2'. The strap is of comparatively thin spring metal, and the ends of the arms 5 and 6 are provided with straight extensions 7 and 8 respectively, the extension 8 being formed with an outturned lip 9. The lip 9 of each of the clamps provides a locking means for a nut 10, a short bolt 11 passing through the lips 7 and 8 and through the said bolt.

Finding bearings through the eyes 3 of the respective clamps there is a rod 12. The rod is in the nature of a shaft, and has its upper end bent angularly to provide the same with a handle 13. The handle 13 is disposed a slight but suitable distance below the steering wheel 14, and likewise below the spark and gas control levers. The opposite or lower end of the shaft 12 is also bent to arrange the same at a different angle than the handle 13. This lower bent portion, indicated by the numeral 15, is flattened and has pivotally secured to its outer end a link 16. The link is directed toward the switch handle 2, and has swingably supported on its outer end a clamp 17 which receives the switch handle 2 therethrough. The clamp 17 is constructed from a single piece of spring metal having a central rectangular opening therethrough the sides of which providing jaws. The lower ends of the sides are bent at an inward angle, as at 18, and are divided from each other. The opposite or connecting portion for the sides or jaws of the clamp has a threaded opening therethrough, and screwed through this opening there is a bolt 19 that contacts with the outer edge of the handle 2 and which freely passes through an opening in the link 16.

The side members or jaws of the clamp 17 are sprung away from each other when the said clamp is insterted over the switch handle 2 and a release of pressure thereagainst will cause the said sides or jaws to exert a frictional contact against the sides of the handle 2. When the element 19 is adjusted with respect to the handle 2, the offset ends 18 of the jaws will also exert a frictional contact with the inner edge of the handle.

With our improvement, the handle 13 of the shaft 12 being located in close proximity to the steering wheel 14 may be readily actuated by the operator of the vehicle so that the shaft 12 may be swung to influence the link to turn the switch handle 2 to cut off the headlights or to dim or to brighten the same without any liability of the driver losing control of the steering wheel. The construction is extremely simple and may be cheaply manufactured and easily applied. When positioned, no further adjustment is required, and it is thought that the foregoing description, when taken in connection with the drawing will fully set forth the construction and its advantages to those skilled in the art to which such inventions relate.

Having described the invention, we claim:—

A clamp comprising a flexible strap which is centrally bent upon itself to provide an eye for a shaft and having lapping portions projecting from the eye which are connected and which are further formed with projections providing arms each of which terminating in straight extensions and one of said extensions being lipped, a nut on the last mentioned extension, and a bolt passing through both extensions and engaging the nut.

In testimony whereof we affix our signatures.

JOHN B. GIACHETTO.
BENJAMIN TEX.